Dec. 9, 1924.
B. BONNIKSEN
SPEED OR LIKE INDICATING DEVICE
Filed Nov. 16, 1922
1,518,244
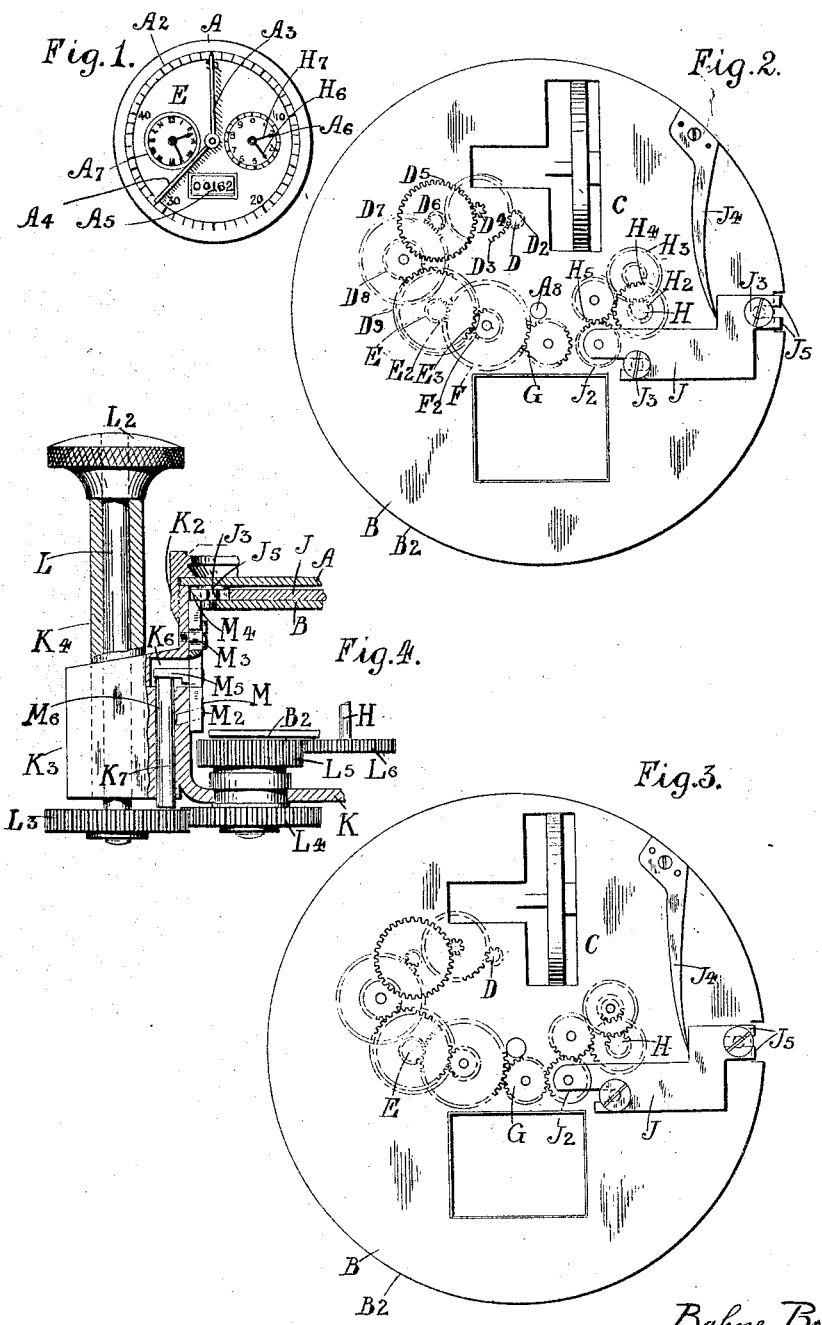

Patented Dec. 9, 1924.

1,518,244

UNITED STATES PATENT OFFICE.

BAHNE BONNIKSEN, OF LEAMINGTON, ENGLAND.

SPEED OR LIKE INDICATING DEVICE.

Application filed November 16, 1922. Serial No. 601,263.

*To all whom it may concern:*

Be it known that I, BAHNE BONNIKSEN, a subject of the King of England, residing at Leamington, in the county of Warwick, England, have invented certain new and useful Improvements in Speed or like Indicating Devices, of which the following is a specification.

My invention relates to indicating devices for showing the speed of a vehicle or the rotational speed of a machine, of the kind in which the indicating device is periodically connected with the driving means for a definite interval of time which is controlled by an escapement deriving its maintaining power from the same driving means. The principal object of the present invention is to provide in an instrument of this kind, certain improvements, hereunder set forth, which will extend considerably its utility.

According to this invention, there is combined with an indicating device embodying escapement mechanism, a time counting mechanism which is connected with the escapement, and thereby is adapted to show the total time during which the indicator has been in operation, this representing also the period or aggregate of the periods during which the vehicle or machine has been in motion.

In this connection, I would make reference to my Patent 1,134,369 fully describing the escapement mechanism and its operation in indicating the speed of a vehicle.

Means are also provided for re-setting the counting mechanism to zero, and thus it is possible readily to register daily the number of working hours of the vehicle or machine.

Where the indicator is provided with a distance register, or a revolution counter, it will be evident that distance or revolutions can be read directly against time occupied, so that average speed or revolutions can be obtained by a simple calculation. Such registering means usually have combined with them a device for re-setting to zero, and a further feature of the present invention is the employment of such an existing device to re-set the time counter also, or alternatively to provide a device which will re-set both counters and thus avoid the use of extraneous parts.

The manner of carrying out the invention is illustrated in the accompanying drawings, in which—

Figure 1 shows the face of a speed indicator for use on a vehicle, the casing and bezel having been removed for clearness.

Figure 2, on a larger scale than Fig. 1, is a front view of the mechanism with the dial and pointers or hands removed to show the time and the distance (or equivalent) counting trains in their normal relationship.

Figure 3 is a view similar to Figure 2 except that the two counting trains are brought into operative connection for re-setting purposes, and Figure 4 is a fragmentary sectional side view of the instrument showing the re-setting mechanism.

The dial A of the instrument is graduated at $A^2$ in miles per hour, and indications thereon are made by the pointers $A^3$, $A^4$, which periodically and in turn, under the control of the escapement, are engaged with the driving means, the arrangement being such that, as shown in Figure 1, one pointer is inoperative at zero while the other is temporarily locked in the indicating position. At $A^5$ is a mileage counter showing the total number of miles run, and at $A^6$ is a trip counter adapted to show the day's run or the distance covered by a journey, and provided with the usual means for re-setting to zero, which later will be more particularly referred to.

The time counting device, forming the principal feature of the present invention, is indicated at $A^7$ and conveniently takes the form common to time-pieces in being provided with hour and minute hands and having a range of twelve hours. It is to be understood, however, that the invention is not limited to this arrangement, and alternatively, the dial might be decimally arranged to show hours and decimals thereof, the number around the dial then preferably being ten instead of twelve.

In Figures 2 and 3 the dial is removed and the mechanism is shown mounted upon and between the plates B $B^2$. The balance wheel of the escapement mechanism acting in the well-known manner is indicated at C, and at D is the spindle carrying the escape wheel which is controlled by the balance and is driven in the manner already referred to. At E is shown the spindle carrying the minute hand of the dial $A^7$, and this is driven from the escapement spindle D through the train of gearing $D^2$, $D^3$, $D^4$, $D^5$, $D^6$, $D^7$, $D^8$ and $D^9$, the employment of this train forming the principal feature of the invention. The wheel $D^9$ is co-axially mounted upon the spindle E and is in frictional driving engagement with the cannon pinion $E^2$ fixed to the spindle E. The cannon pinion $E^2$ engages the wheel F carrying fast with it the pinion $F^2$ engaging with the wheel $E^3$ co-axially mounted with the spindle E, and carrying the hour hand of the dial $A^7$, this arrangement forming the well-known method of driving the hands of a time-piece and providing for their setting or alteration.

At H is shown the spindle which carries the distance counting pointer of the dial $A^6$, and this, with the train $H^2$, $H^3$, $H^4$ and $H^5$, generally constitutes an existing train driven through the mechanism in conjunction with the counter $A^5$. To extend its range of usefulness it is preferably provided with two pointers or hands $H^6$, $H^7$ co-axially mounted and actuated in a manner similar to the two hands of the time counter. The long hand $H^6$ records the units while the short hand $H^7$ records the tens up to a hundred, the "motion wheels" (not shown) being of the appropriate ratios for the purpose. By the employment of suitable friction driving means similar to that for the time counter, the hands $H^6$, $H^7$ can be re-set to zero by the usual mechanism provided for the purpose on the instrument. This, in the present example, is constituted by an operating button $L^2$ carried by a spindle L which is rotatably supported in a sleeve $K^4$ carried by a boss $K^3$ on the outside of the instrument case K and shown particularly in Figure 4. This spindle L carries a wheel $L^3$ gearing with a wheel $L^4$ fast with a wheel $L^5$ within the case which engages with a wheel $L^6$ fast upon the spindle H carrying the pointer for the trip mechanism. This provides means for re-setting the trip to zero, and the further feature of the invention already referred to, is the provision of means for setting also the time counter to zero.

For this purpose a sliding plate J is provided which carries upon it a wheel $J^2$ constituting an idler and in engagement with the wheel $H^5$. Another idler wheel G is in engagement with the wheel F of the time counting device and when the bar J is in the position shown in Figure 2 the two trains are disconnected from one another. When moved to the position shown in Figure 3 the idler wheels $J^2$ and G bring the two trains into engagement, and the operation of the button $L^2$ enables the time counter to be re-set to zero, after which the two trains are separated by moving the bar J and the mileage counter can then be brought to zero also. A spring $J^4$, secured to the plate B, acts upon the bar J to hold the wheels $J^2$ and G normally out of engagement, and the bar is guided in its movements by screws $J^3$ extending through slotted portions of the bar.

To provide simple means for moving the bar J, its outer extremity, at the edge of the plate B, is bevelled as at $J^5$, and mounted slidably on the inner side of the case K is a bar M adapted to slide in a direction parallel with the axis of the case, (that is, at right angles to the bar J), and guided by a pin $M^2$ and screw $M^3$ extending through slots formed in it. One end of this bar M is bevelled at $M^4$ to bear upon the bevelled portion $J^5$ of the bar J so that movement of the bar M will cause a corresponding movement of the bar J against the action of the spring $J^4$ to bring the idle wheels $J^2$ and G into engagement. To effect this in a simple manner the spindle L carrying the button $L^2$ is axially slidable in the sleeve $K^4$ and it operates a plunger $M^6$ arranged parallel with it and bearing between the face of the wheel $L^3$, and a pin $M^5$ projecting laterally from the bar M, a recess $K^6$ being provided in the boss $K^3$ for freedom of movement of the pin $M^5$ and the plunger $M^6$ sliding in a guide hole $K^7$ provided for it in the boss $K^3$.

It will be seen that with the foregoing arrangement the button $L^2$ serves for setting both counters to zero and provides, by imparting an axial movement to the spindle L, for the engagement of the two trains with one another. It will be observed that the width of the teeth of the wheels $L^3$ and $L^4$ is such that this axial movement of the spindle L can take place without throwing the wheels out of gear with one another.

It will be understood that the invention is not limited to the particular arrangement of the two counting dials as illustrated and set forth above, and various slight modifications may be introduced which would add materially to the convenience of reading the instrument. Thus, for example, the two dials might be so graduated that the position of the hour pointer and that of the mileage counter would at all times be parallel to one another if a certain constant speed were maintained. Thus, the dial $A^6$ might have twenty divisions around it so that at a speed of twenty miles per hour the minute hand of the dial $A^7$ would be always parallel with the pointer of the dial $A^6$.

In a further alternative the two dials $A^6$ and $A^7$ might be arranged concentrically with one another so that the time counter and the distance counter could be co-axially mounted, the pointers being suitably distinguished from one another by their colouring or form. Then, if arranged to move at equal speeds around the dial for a certain speed of the vehicle, it will be evident that any difference of position would show at a glance a deviation from the desired speed.

It will be evident that the invention provides in a very simple manner for showing the whole period during which a vehicle has been in motion, and enables the average speed for a journey or series of journeys to be very easily calculated.

What I claim as my invention and desire to secure by Letters Patent of the United States is:—

1. In an indicating mechanism having time and distance counters and escapement mechanism controlling the same, the combination of means for resetting the distance counter to zero and means for connecting at will the time counter with said resetting means.

2. In an indicating mechanism having time and distance counters and escapement mechanism controlling the same, the combination of means for resetting the distance counter to zero and means whereby the driving train of the distance counter can be shifted so as to bring one element thereof into engagement with the train of the time counter, whereby the latter can also be reset to zero by said re-setting means.

3. In an indicating mechanism having time and distance counters and escapement mechanism controlling the same, the combination of means for resetting the distance counter to zero, said means comprising an axially movable rotatable spindle, a slide carrying an idler gear in mesh with the driving train of the distance counter, and means controlled by the axial movement of said spindle for moving said slide to bring said idler into mesh with the train of the time counter, whereby both counters are reset by the same means.

In testimony whereof I have signed my name to this specification in the presence of two subscribing witnesses.

BAHNE BONNIKSEN.

Witnesses:
   JOHN ARKLE,
   EVA COLLIER.